US 7,657,618 B1

(12) United States Patent
Rothstein et al.

(10) Patent No.: US 7,657,618 B1
(45) Date of Patent: Feb. 2, 2010

(54) MANAGEMENT OF MULTIPLE CLIENT REQUESTS

(75) Inventors: Jesse Abraham Rothstein, Seattle, WA (US); Arindum Mukerji, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 873 days.

(21) Appl. No.: 11/139,061

(22) Filed: May 27, 2005

Related U.S. Application Data

(60) Provisional application No. 60/619,385, filed on Oct. 15, 2004.

(51) Int. Cl.
*G06F 15/173* (2006.01)
*G06F 15/16* (2006.01)
*G06F 9/46* (2006.01)

(52) U.S. Cl. .................. 709/223; 709/232; 718/105
(58) Field of Classification Search ............... 709/223
See application file for complete search history.

(56) References Cited

U.S. PATENT DOCUMENTS

| | | | |
|---|---|---|---|
| 3,689,872 A * | 9/1972 | Sieracki ............... 340/825.26 |
| 5,553,242 A * | 9/1996 | Russell et al. ............ 709/227 |
| 6,023,722 A * | 2/2000 | Colyer ..................... 709/201 |
| 6,226,687 B1 * | 5/2001 | Harriman et al. ......... 709/246 |
| 6,336,135 B1 * | 1/2002 | Niblett et al. ............. 709/215 |
| 6,434,618 B1 | 8/2002 | Cohen et al. |
| 6,760,782 B1 * | 7/2004 | Swales .................... 709/250 |
| 6,768,716 B1 | 7/2004 | Abel et al. |
| 6,789,203 B1 * | 9/2004 | Belissent .................. 726/22 |
| 6,799,276 B1 * | 9/2004 | Belissent .................. 726/14 |
| 6,831,923 B1 * | 12/2004 | Laor et al. ................ 370/412 |
| 6,854,117 B1 * | 2/2005 | Roberts ................... 718/102 |
| 7,051,330 B1 * | 5/2006 | Kaler et al. .............. 718/106 |
| 7,139,811 B2 * | 11/2006 | Lev Ran et al. .......... 709/217 |
| 7,231,445 B1 * | 6/2007 | Aweya et al. ............. 709/226 |
| 7,313,627 B1 * | 12/2007 | Noble ..................... 709/233 |
| 7,362,762 B2 * | 4/2008 | Williams et al. ......... 370/394 |

(Continued)

OTHER PUBLICATIONS

W. Richard Stevens, TCP/IP Illustrated, vol. 1: The Protocols, Addison-Wesley Professional, Dec. 31, 1993 ISBN-10: 0-201-63346-9 ISBN-13: 978-0-201-63346-7.*

(Continued)

*Primary Examiner*—Saleh Najjar
*Assistant Examiner*—Robert Shaw
(74) *Attorney, Agent, or Firm*—Darby & Darby P.C.; Jamie L. Wiegand

(57) ABSTRACT

A system, apparatus, and method are directed to managing multiple back-end connections for pipelined HTTP communications. A traffic management device is configured to open back-end connections to multiple servers. The traffic management device distributes HTTP requests from a client device across multiple server connections. Instead of buffering the responses to ensure that each are returned in a same order as the requests, the traffic management device throttles a TCP receive window between all of the back-end server connections, but that back-end server connection associated with a first expected response. As each response is sent to the client device, the TCP window for the next back-end server connection is opened. This effectively offloads any significant buffering onto the back-end servers, enabling the traffic management device to return the responses in the same order as the requests.

41 Claims, 3 Drawing Sheets

U.S. PATENT DOCUMENTS

| | | | |
|---|---|---|---|
| 7,421,515 B2 * | 9/2008 | Marovich | 709/250 |
| 7,484,011 B1 * | 1/2009 | Agasaveeran et al. | 709/250 |
| 2002/0055980 A1 * | 5/2002 | Goddard | 709/217 |
| 2002/0073223 A1 * | 6/2002 | Darnell et al. | 709/232 |
| 2002/0085587 A1 * | 7/2002 | Mascolo | 370/477 |
| 2002/0107903 A1 * | 8/2002 | Richter et al. | 709/201 |
| 2003/0018827 A1 * | 1/2003 | Guthrie et al. | 709/318 |
| 2003/0050974 A1 * | 3/2003 | Mani-Meitav et al. | 709/203 |
| 2003/0061256 A1 * | 3/2003 | Mathews et al. | 709/101 |
| 2003/0110230 A1 * | 6/2003 | Holdsworth et al. | 709/207 |
| 2003/0126029 A1 * | 7/2003 | Dastidar et al. | 705/26 |
| 2004/0006638 A1 * | 1/2004 | Oberlander et al. | 709/232 |
| 2004/0037322 A1 * | 2/2004 | Sukonik et al. | 370/476 |
| 2005/0144278 A1 * | 6/2005 | Atamaniouk | 709/225 |
| 2006/0020598 A1 * | 1/2006 | Shoolman et al. | 707/8 |
| 2006/0265689 A1 | 11/2006 | Kuznetsov et al. | |
| 2007/0094336 A1 * | 4/2007 | Pearson | 709/206 |

OTHER PUBLICATIONS

Schroeder et al, Scalable Web ServerClustering Technologies, IEEE Network May/Jun. 2000, p. 38-45.*

Bryhni, et al, A Comparison of Load Balancing Techniques for Scalable Web Servers, IEE Network, Jul./Aug. 2000, p. 58-64.*

Stevens, RFC 2001, TCP Slow Start, Congestion Avoidance, Fast Retransmit, and Fast Recovery Algorithms, Jun. 1997.*

Fielding, R. et al., "Hypertext Transfer Protocol—HTTP/1.1," Jun. 1999, pp. 1-176, W3 Consortium, http://www.w3.org/Protocols/rfc2616/rfc2616.html.

Jacobson, V. et al., "TCP Extensions for High Performance," May 1992, pp. 1-37, http://www.faqs.orq/rfcs/rfc1323.html.

Mapp, Glenford, "Transport Protocols—What's wrong with TCP," Jan. 28, 2004, pp. 1-60, LCE Lecture at: http://www-Ice.eng.cam.ac.uk/~gem11, 4F5-Lecture4.pdf.

Nielsen, H. F. et al., "Network Performance Effects of HTTP/1.1, CSS1, and PNG," Jun. 24, 1997, 1-19 pgs., W3 Consortium, http://www.w3.org/TR/NOTE-pipelining-970624$Id: Pipeline.html, v 1.48 Oct. 18, 1999 19:38:45 root Exp $.

Postel J., "Transmission Control Protocol," Sep. 1981, pp. 1-16, Information Sciences Institute, University of Southern California, Marina del Rey, California, http://www.faqs.org/rfcs/rfc793.html.

Stevens, W., "TCP Slow Start, Congestion Avoidance, Fast Retransmit, and Fast Recovery Algorithms," Jan. 1997, pp. 1-6, Suniste.dk, http://rfc.sunsite.dk/rfc/rfc2001.html.

* cited by examiner

MANAGEMENT OF MULTIPLE CLIENT REQUESTS

CROSS-REFERENCE TO RELATED APPLICATIONS

The present application claims priority from provisional application Ser. No. 60/619,385 entitled "Management of Multiple Back-end Network Connections Using a Traffic Management Device," filed on Oct. 15, 2004, which is further hereby incorporated within.

FIELD OF THE INVENTION

The invention relates generally to remote computing connections, and more particularly but not exclusively to managing multiple requests from a client device.

BACKGROUND OF THE INVENTION

The Hypertext Transfer Protocol (HTTP) is a networking protocol for distributed, collaborative, hypermedia computing information systems. HTTP is considered to be a an application layer, or layer seven, protocol, of a seven-layer protocol stack as defined by the ISO-OSI (International Standards Organization-Open Systems Interconnection) framework. TCP is considered to be layer four, known as the transport layer, of the protocol stack. The HTTP protocol operates as a request/response protocol. That is, a client may send a request to a server in the form of a request method, Uniform Resource Identifier (URI), and protocol version. The server then provides a response to the request. Traditionally, HTTP requests are issued sequentially, with a next request being issued by the client only after a response to the current request has been completely received. Depending on network latencies and bandwidth limitations, this may result in a significant delay before the next request is received by the server.

Version 1.1 of the HTTP protocol, as described in Request for Comments (RFC) 2616 (available at http://www.faqs.org/rfcs/rfc2616.html), however, allows for multiple HTTP requests to be written out together without waiting for the corresponding responses. The responses, however, then must arrive to the client in the same order as the requests so that they can be properly associated with the corresponding request. This act, known as pipelining of the requests, can sometimes result in a dramatic improvement in page loading times, especially over high latency connections.

An intermediate device with a cache that is configured to support pipelining might retrieve each request not already in the cache where there are multiple back-end connections (e.g., multiple back-end servers), in order to provide a faster response. A non-caching proxy or traffic management device may serialize the requests and responses, however. This provides for in-order responses without a need to buffer the responses. However, while this approach may not break pipelining, it may significantly diminish its benefits in terms of reducing total latency, especially where a back-end server is slow. Therefore, it is with respect to these considerations and others that the present invention may been made.

BRIEF DESCRIPTION OF THE DRAWINGS

Non-limiting and non-exhaustive embodiments of the invention are described with reference to the following drawings. In the drawings, like reference numerals refer to like parts throughout the various figures unless otherwise specified.

For a better understanding of the invention, reference will be made to the following Detailed Description of the Invention, which is to be read in association with the accompanying drawings, wherein.

DETAILED DESCRIPTION OF THE INVENTION

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment, an entirely software embodiment or an embodiment combining software and hardware aspects. The following detailed description is, therefore, not to be taken in a limiting sense.

Briefly stated, the invention is directed towards a system, apparatus, and method for managing multiple back-end connections for pipelined HTTP communications. A traffic management device is configured to open multiple back-end connections to the server or servers. The traffic management device distributes HTTP requests from a client device across the multiple server connections. Instead of buffering the responses to ensure that each are returned in the same order as the requests, the traffic management device throttles an advertised TCP receive window (e.g., sets the TCP receive window size to a sufficiently small size in order to minimize an amount of data required to be buffered by the traffic management device) between all of the back-end server connections, except for the back-end server connection associated with a first expected response. As each response is sent to the client device, the TCP window for the next back-end server connection is opened. This effectively offloads any significant buffering onto the back-end servers, enabling the traffic management device to return the responses in the same order as the requests.

Illustrative Operating Environment

Figure 1:
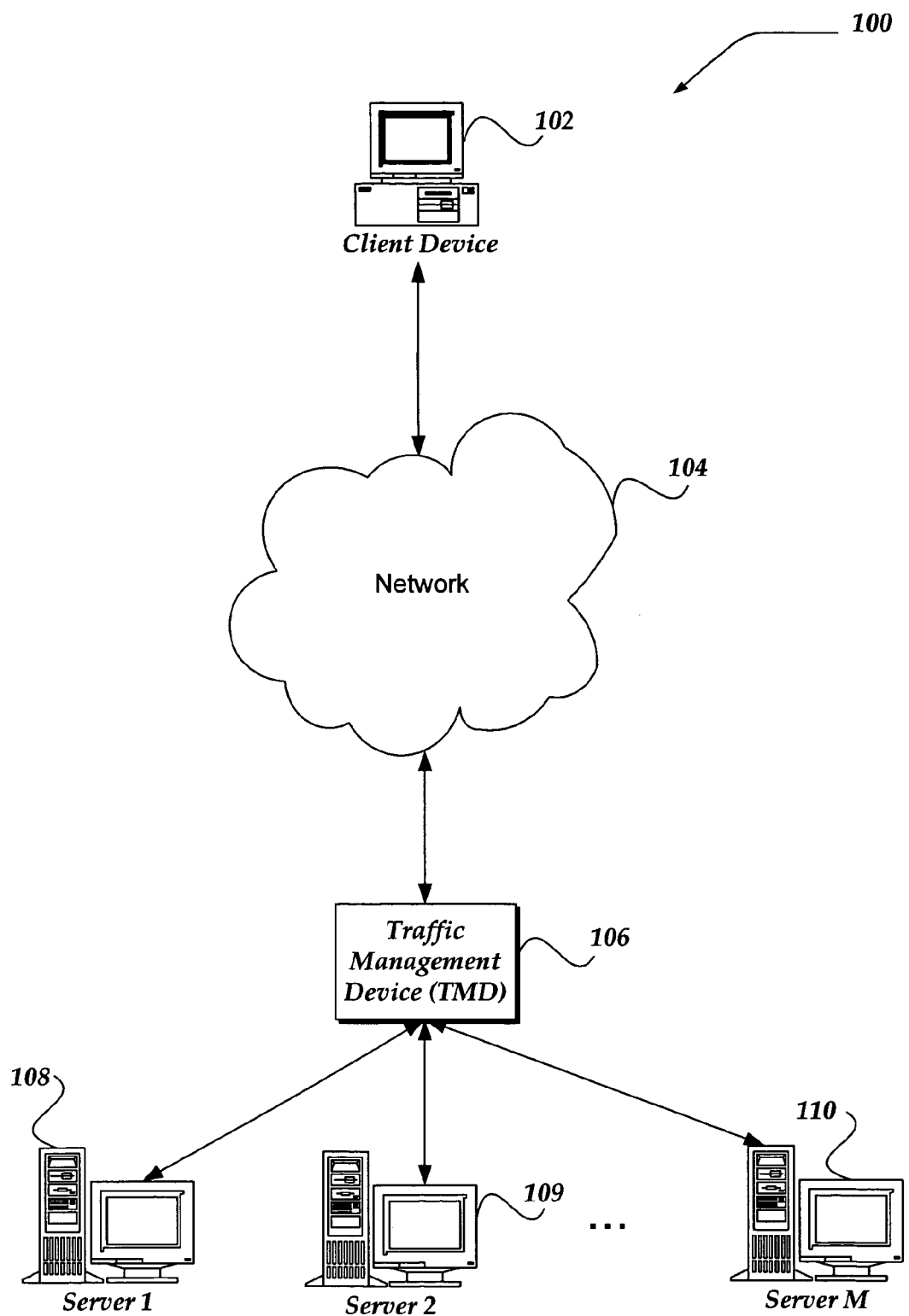
FIG. 1 shows a functional block diagram illustrating one embodiment of an environment for practicing the invention.

FIG. 1 illustrates one embodiment of an environment in which the invention may operate. However, not all of these components may be required to practice the invention, and variations in the arrangement and type of the components may be made without departing from the spirit or scope of the invention.

As shown in the figure, system 100 includes client device 102, network 104, traffic management device (TMD) 106, and back-end servers 108-110. Client device 102 is in communication with TMD 106 through networks 104. TMD 106 is in further communication with back-end servers 108-110. Although not shown, TMD 106 may be in communication with back-end servers 108-110 through a network infrastructure that is similar to network 104.

Generally, client device 102 may include virtually any computing device capable of connecting to another computing device to send and receive information, including emails, requests for information from a server, and the like. The set of such devices may include devices that typically connect using a wired communications medium such as personal computers, multiprocessor systems, microprocessor-based or programmer consumer electronics, network PCs, and the like. The set of such devices may also include devices that typically connect using a wireless communications medium such as cell phones, smart phones, radio frequency (RF) devices, infrared (IR) devices, integrated devices combining one or more of the preceding devices, or virtually any mobile device. Similarly, client device 102 may be any device that is capable of connecting using a wired or wireless communication medium such as a PDA, POCKET PC, wearable computer, and any other device that is equipped to communicate over a wired and/or wireless communication medium.

Client device 102 may further include a client application that is configured to manage various actions. Moreover, client device 102 may also include a web browser application, that is configured to enable an end-user to interact with other devices and applications, over network 104. In one embodiment, the web browser is configured to provide various functions, including, but not limited to, authentication, enabling multiple requests for information, and the like. The web browser may further enable inputs, such as keyboard, mouse, audio, and the like.

Network 104 is configured to couple client device 102, with other network devices, such as TMD 106. Network 104 is enabled to employ any form of computer readable media for communicating information from one electronic device to another. In one embodiment, network 104 is the Internet, and may include local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 104 may further employ a plurality of wireless access technologies including, but not limited to, 2nd (2G), 3rd (3G) generation radio access for cellular systems, Wireless-LAN, Wireless Router (WR) mesh, and the like. Access technologies such as 2G, 3G, and future access networks may enable wide area coverage for network devices, such as client device 102, and the like, with various degrees of mobility. For example, network 104 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like.

Furthermore, remote computers and other related electronic devices could be remotely connected to either LANs or WANs via a modem and temporary telephone link. In essence, network 104 includes any communication method by which information may travel between client device 102 and TMD 106.

Additionally, network 104 may include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as, but not limited to, twisted pair, coaxial cable, fiber optics, wave guides, and other wired media and wireless media such as, but not limited to, acoustic, RF, infrared, and other wireless media.

TMD 106 includes virtually any device that manages network traffic. Such devices include, for example, routers, proxies, firewalls, load balancers, cache devices, devices that perform network address translation, any combination of the preceding devices, and the like. TMD 106 may, for example, control the flow of data packets delivered to and forwarded from an array of servers, such as back-end servers 108-110. TMD 106 may direct a request for a resource to a particular server based on network traffic, network topology, capacity of a server, content requested, and a host of other traffic distribution mechanisms. TMD 106 may receive data packets from and transmit data packets to the Internet, an intranet, or a local area network accessible through another network. TMD 106 may recognize packets that are part of the same communication, flow, and/or stream and may perform special processing on such packets, such as directing them to the same server so that state information is maintained. TMD 106 also may support a wide variety of network applications such as Web browsing, email, telephony, streaming multimedia and other traffic that is sent in packets. TMD 106 may also control non-packetized network traffic, such as analog signals.

TMD 106 may receive requests from client device 102. TMD 106 may select a server from back-end servers 108-110 to forward the request. TMD 106 may employ any of a variety of criteria and mechanisms to select the server, including those mentioned above, load balancing mechanisms, and the like. TMD 106 is further configured to receive a response to the request and to forward the response to client device 102. Moreover, TMD 106 may receive multiple requests in a pipeline from client device 102. In which instance, TMD 106 may select multiple servers to forward the requests. TMD 106 may employ a process such as described below in conjunction with FIG. 3 to manage the pipelined requests and responses.

TMD 106 may be implemented using one or more personal computers, servers, multiprocessor systems, microprocessor-based or programmable consumer electronics, network PCs, radio frequency (RF) devices, infrared (IR) devices, integrated devices combining one or more of the preceding devices, and the like. Such devices may be implemented solely in hardware or in hardware and software. For example, such devices may include some application specific integrated circuits (ASICs) coupled to one or more microprocessors. The ASICs may be used to provide a high-speed switch fabric while the microprocessors may perform higher layer processing of packets. An embodiment of a network device that could be used as TMD 106 is network device 200 of FIG. 2, configured with appropriate software. The BIG-IP® family of traffic managers, by F5 Networks of Seattle, Wash., are examples of TMDs.

Back-end servers 108-110 (1-M) may include any computing device capable of communicating packets with client computer 102. Each packet may convey a piece of information. A packet may be sent for handshaking, i.e., to establish a connection or to acknowledge receipt of data. The packet may include information such as a request, a response, or the like. Generally, packets received by back-end servers 108-

110 will be formatted according to TCP/IP, but they could also be formatted using another transport protocol, such as User Datagram Protocol (UDP), Internet Control Message Protocol (ICMP), Netbeui, IPX/SPX, token ring, and the like. Moreover, the packets may be communicated between back-end servers 108-110, TMD 106, and client device 102 employing HTTP, HTTPS, and the like.

In one embodiment, back-end servers 108-110 are configured to operate as a website server. However, back-end servers 108-110 are not limited to web servers, and may also operate a messaging server, a File Transfer Protocol (FTP) server, a database server, content server, and the like. Additionally, each of back-end servers 108-110 may be configured to perform a different operation. Thus, for example, back-end server 108 may be configured as a messaging server, while back-end server 109 is configured as a database server. Moreover, while back-end servers 108-110 may operate as other than a website, they may still be enabled to receive an HTTP communication.

Devices that may operate as back-end servers 108-110 include personal computers desktop computers, multiprocessor systems, microprocessor-based or programmable consumer electronics, network PCs, servers, and the like.

Illustrative TMD Environment

Figure 2:
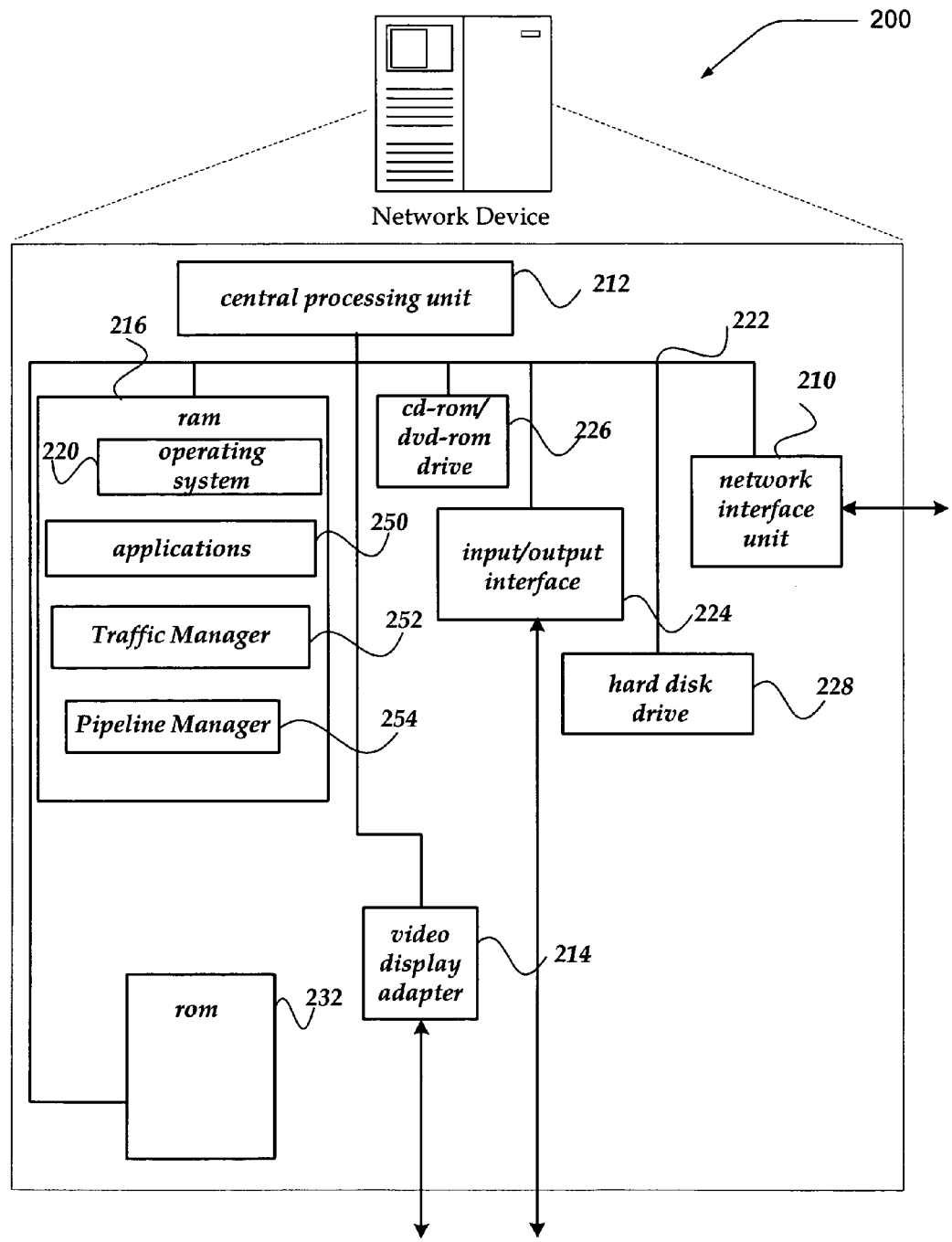
FIG. 2 shows one embodiment of a server device that may be included in a system implementing the invention.

FIG. 2 shows one embodiment of a network device, according to one embodiment of the invention. Network device 200 may include many more or less components than those shown. The components shown, however, are sufficient to disclose an illustrative embodiment for practicing the invention. Network device 200 may represent, for example, TMD 106 of FIG. 1.

Network device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200. Any general-purpose operating system may be employed.

As illustrated in FIG. 2, network device 200 also can communicate with the Internet, or some other communications network, such as network 104 in FIG. 1, via network interface unit 210, which is constructed for use with various communication protocols including the TCP/IP protocol. Network interface unit 210 is sometimes known as a transceiver, transceiving device, or network interface card (NIC).

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs may include email programs, routing programs, schedulers, calendars, database programs, word processing programs, HTTP programs, security programs, and so forth. Mass storage may further include applications such as traffic manager 250, and pipeline manager 254.

Traffic manager 252 is configured to receive a request from a client device and to forward the request to a server based on a variety of criteria. For example, traffic manager 252 may select the server to forward the request based any of a variety of load-balancing mechanism, including a round trip time (RTT), a least connections, a packet completion rate, a quality of service, a topology, a global availability, a hop metric, a hash of an address in a received packet, a static ratio, a dynamic ratio, a source IP address, a destination IP address, a port number, deep-packet inspections including of application layer data, employing historical data and the like, session persistence, and a round robin mechanism. In another embodiment, traffic manager 252 may forward the request based on a type of request. For example, a database request may be forwarded to a predefined database server, while an email request may be forwarded to a predefined email server.

Traffic manager 252 is further configured to receive a response from a server, such as back-end servers 108-110 of FIG. 1, and to forward the response to the requesting device, such as client device 102 of FIG. 1. Traffic manager 252 may interact with pipeline manager 254 when there are multiple requests, such as pipelined requests from a requesting device.

Pipeline manager 254 is configured to manage pipelined requests and responses to ensure that the responses maintain the same order as the requests. Pipeline manager 254 may maintain the same order by varying TCP window sizes associated with incoming data for each server connection.

Briefly, a TCP window manages an amount of outstanding data that a sending device may send on a particular connection before it gets an acknowledgment back from the receiving device that it has gotten some of the data. The window size field is described in Request for Comments (RFC) 793 (available at http://www.faqs.org/rfcs/rfc793.html). By varying, or throttling, a TCP receive window size, pipeline manager 254 may control the flow of data it receives from each server connection. In one embodiment of the invention, the pipeline manager sets the window size to be zero or a value substantially close to zero so as to prevent the server from sending data packets on the corresponding connection. It may, for example, set the window size in a TCP SYN packet sent to the server during the initial TCP handshake that is used to create TCP connection. This has the effect of instructing the server to not send data packets. When the pipeline manager is ready to receive data on a connection that has been throttled, it may unthrottle the connection by sending a TCP packet with an increased window size designation to the server. Managing the flow of the data for selected servers enables pipeline manager 254 to give a priority to one server connection for incoming data over the other server connections. By providing selective priority to a server connection, pipeline manager 254 may order the responses from multiple server connections and thus maintain the same order of responses as that of the requests. Moreover, by throttling the responses from the server, pipeline manager 254 effectively offloads any significant buffering of responses from the servers. In some situations, reducing the connection's TCP window size prior to the server sending any data may allow the TMD to avoid buffering data. However, it is possible that the invention may not be able to delay receiving the response completely, because some TCP stacks may be unable to react positively to a zero TCP window size at a beginning of a connection. This may result, in some situations, the TMD buffering a small amount of data, such as one or two kilobytes, of the response, and no more. In some situations, such as for small responses, the entire response could be accepted from that connection, and then that connection may be shutdown. Pipeline manager 254 together with traffic manager 252 may employ, for example, process 300 of FIG. 3 to perform the actions described above.

It is to be noted that the TMD may throttle a connection by specifying a zero or small window size during the initial connection setup with a server. Alternatively, the TMD may specify a larger window size when it is setting up an initial connection, and then send a later instruction specifying a zero or small window size. The TMD may send a request over a connection that has already had its window size set to a zero or small value. In one configuration, unthrottling a TCP window includes setting the window size to be a value based on the size of the response, which can be obtained from the HTTP content-length field received from the server, if the response uses the HTTP protocol. Response lengths may also be extracted from data in other protocols. TCP window scaling, as described in RFC 1323 (available at http://www.faqs.org/rfcs/rfc1323.html), may be used to specify a window length. In one implementation, as portions of the response are received, the TMD specifies decreasing window sizes, based on a remaining length of the response. The specified window size may be approximately a size that would allow the response to be received, but would not allow a subsequent response to be received. In this manner, after a response is received on the connection, a subsequent response on the same connection is throttled due to the window having been filled. By using this technique, multiple requests may be sent over a common server connection, and each response can be individually throttled.

Although pipeline manager 254 is described as throttling a TCP window size, the invention is not so limited, and other communication interface protocols and/or mechanisms may be employed to throttle, or vary a transmission speed of data from a server, without departing from the scope or spirit of the present invention. For example, throttling of a server connection may be performed by dropping one or more a response segments without acknowledging them.

According to the TCP protocol, when the server does not receive an acknowledgement of a data packet after a specified period of time, the server retransmits the data packet. In order to reduce the time that the server waits before resending the data packet, when the TMD is ready to receive data on a server connection in which one or more packets have been dropped, the TMD may transmit three ACK packets to the server in rapid succession. This procedure is done according to the TCP fast retransmit protocol, described in RFC 2001, available at http://www.faqs.org/rfcs/rfc2001.html. The receipt of three successive ACK packets functions as a signal to the server to resend the one or more data packets for which it received no acknowledgement. Although illustrated in FIG. 2 as distinct components, traffic manager 250 and pipeline manager 254 may be arranged, combined, and the like, in any of a variety of ways, without departing from the scope of the invention. For example traffic manager 250 and pipeline manager 254 may be configured to operate a single component. Moreover, traffic manager 250 and pipeline manager 254 may reside in one or more computing devices similar to network device 200.

Network device 200 may also include an SMTP handler application for transmitting and receiving e-mail, an HTTP handler application for receiving and handing HTTP requests, and an HTTPS handler application for handling secure connections. The HTTPS handler application may initiate communication with an external application in a secure fashion. Moreover, network device 200 may further include applications that support virtually any secure connections, including TLS, TTLS, EAP, SSL, IPSec, and the like. Similarly, network device 200 may include applications that support a variety of tunneling mechanisms, such as VPN, PPP, L2TP, and so forth.

Network device 200 also includes input/output interface 224 for communicating with external devices, such as a mouse, keyboard, scanner, or other input devices not shown in FIG. 2. Likewise, network device 200 may further include additional mass storage facilities such as CD-ROM/DVD-ROM drive 226 and hard disk drive 228. Hard disk drive 228 may be utilized to store, among other things, application programs, databases, and the like.

In one embodiment, the network device 200 includes at least one Application Specific Integrated Circuit (ASIC) chip (not shown) coupled to bus 222. The ASIC chip can include logic that performs some of the actions of network device 200. For example, in one embodiment, the ASIC chip can perform a number of packet processing functions for incoming and/or outgoing packets. In one embodiment, the ASIC chip can perform at least a portion of the logic to enable the operation of traffic manager 252 and/or pipeline manager 254.

In one embodiment, network device 200 can further include one or more field-programmable gate arrays (FPGA) (not shown), instead of, or in addition to, the ASIC chip. A number of functions of the network device can be performed by the ASIC chip, the FPGA, by CPU 212 with instructions stored in memory, or by any combination of the ASIC chip, FPGA, and CPU.

Generalized Operation

Figure 3:
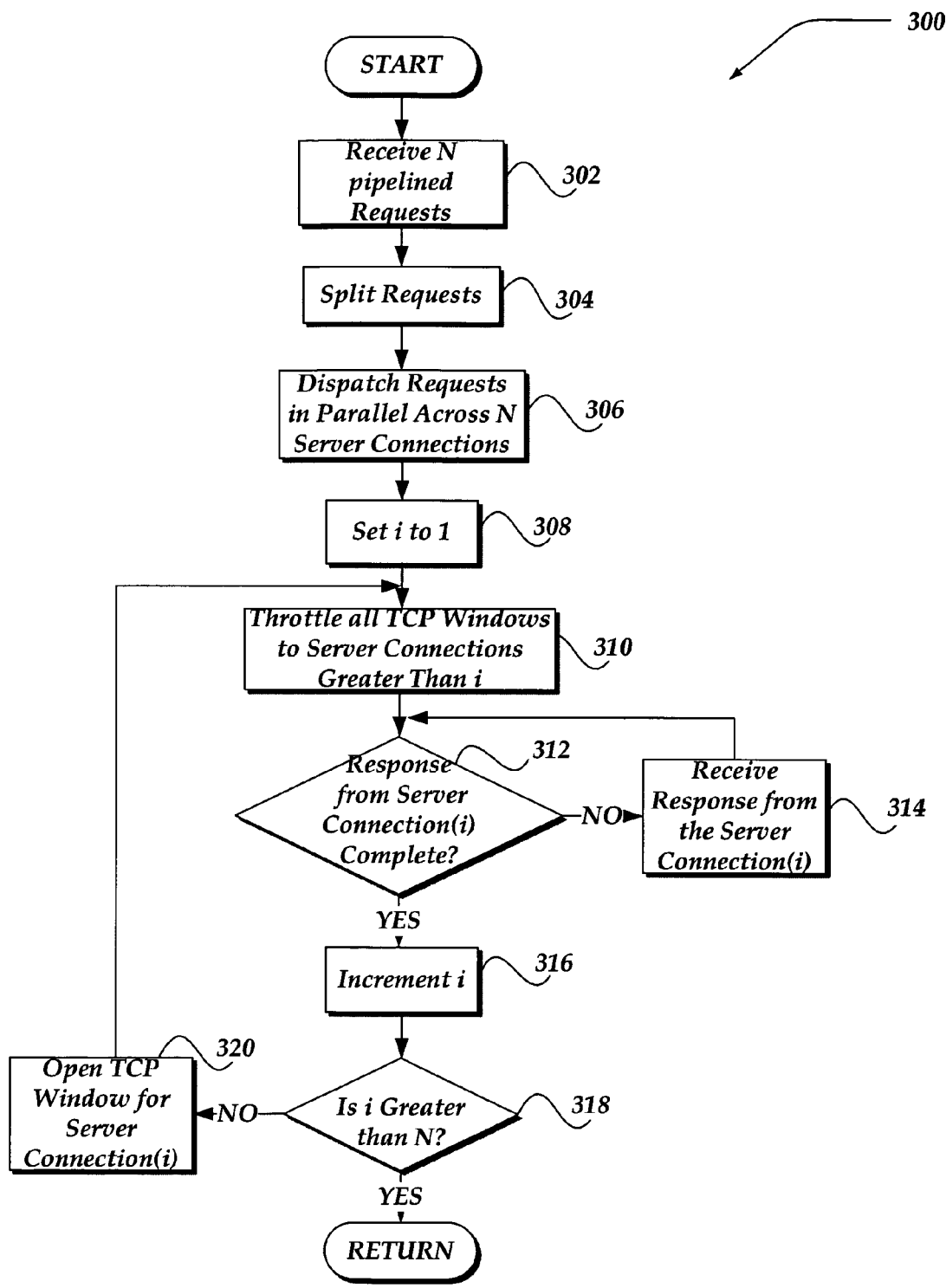
FIG. 3 illustrates a logical flow diagram generally showing one embodiment of a process for managing multiple backend server connections, in accordance with the invention.

The operation of certain aspects of the invention will now be described with respect to FIG. 3. FIG. 3 illustrates a logical flow diagram generally showing one embodiment of a process for managing multiple backend server connections. Portions of process 300 may be performed by traffic manager 252, while other portions may be performed by pipeline manager 254 of FIG. 2, as appropriate.

Process 300 of FIG. 3 begins, after a start block, at block 302, where N multiple pipelined requests are received from a client device. Such pipelined requests may be received using HTTP, and the like. Processing flows to block 304, where the requests are split into N distinct requests. However, an order of the requests are identified and associated with each request.

Processing continues to block 306 where the N distinct requests are dispatched in parallel across N server connections. Selection of which server to dispatch a request towards may be based on a variety of criteria, including those discussed above. For example, it may be determined that all N requests are to be sent to a particular server (having N server connections). In another situation, it may be determined that all N requests might be sent to a larger subset of servers. Thus, it may be that some servers may receive more than one request.

In one embodiment, N pipelined client requests are split across M server connections, where M is less than N. In this embodiment, the network device 200 maintains a pipeline with one or more servers. The network device may send two or more of the client requests are pipelined requests within a server connection, and may do this with one or more server connections. The two or more requests that are sent within a server connection may be consecutive requests according to the ordering of the pipelined client requests, or they may be nonconsecutive requests. Handling of server pipelines is discussed below.

Process 300 then moves to block 308, where a counter (i) is set to 1. The counter values 'line-up' with the expected server connection responses that correspond to the order of the requests. The counter provides a convenient mechanism for managing the selective throttling of a communication interface, however, the invention is not constrained to this mechanism, and another may be employed to manage throttling across selected server connections.

Moreover, dispatching the N distinct requests in parallel is directed towards improving a perceived response time to the client's requests. This may because, a typical client request may include a request for dynamic content, where dynamic content includes content that may not have a pre-determined response. As such, a server receiving the request may need to perform some, possibly time consuming, activity, such as a database query, and the like, to prepare the response. Thus, preparation of the response may take some time to generate. By dispatching the request in N distinct parallel requests, at least some of the servers may have processed their responses by the time that their TCP window is unthrottled.

Process 300 proceeds next to block 310, where all the TCP window sizes are throttled back for server connections greater than (i). The server connection that corresponds to the first request in the pipeline has its TCP window size sufficiently opened to enable its response flow to proceed.

Processing next proceeds to decision block 312, where a determination is made whether the response from server connection (i) has been fully received. If it has not been fully received, processing flows to block 314, where the response from server connection (i) is allowed to continue to be received. Processing continues next from block 314 to loop back to decision block 312.

However, if at decision block 312, the response from server connection (i) has been fully received, processing flows to block 316, where the counter (i) is incremented. Incrementing the counter (i) enables selection of the next server connection in the order of server connections that corresponds to the order of the requests in the pipeline. Processing then flows to decision block 318, to determine whether there are any more responses to be received for this pipeline of multiple requests. That is, is counter (i) greater than N? If it is, then processing returns to a calling process to perform other actions; otherwise, processing flows to block 320.

At block 320, the TCP window size for server connection (i) is opened to enable its response flow to proceed. Processing then loops back to block 310, where the process continues until all of the responses have been received, in the order that corresponds with the pipelined requests.

In one embodiment, N pipelined client requests are split across M server connections, where M is less than N. In this embodiment, the network device 200 maintains a pipeline with one or more servers. The network device may send two or more of the client requests as pipelined requests within a server connection, and may do this with one or more server connections. The two or more requests that are sent within a server connection may be consecutive requests according to the ordering of the pipelined client requests, in which case, the consecutive requests are treated as a single request in the processes described above. A network device may send two or more nonconsecutive requests as pipelined requests within a server connection. In this situation, the network device may throttle the network connection after receiving one of the responses, in order to delay receiving the next response of the set of pipelined requests sent within the server connection.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Additional techniques for throttling server responses by sending an ICMP source quench or repeated ECN (explicit congestion notification) messages to throttle a TCP server connection. It may then unthrottle the connection by sending one or more ACKs to the server. A TMD may also throttle connections by dropping packets, and then unthrottle the connection by sending an ACK packet. In one embodiment, TMD 106 controls analog signals. It may, for example, throttle responses from servers by removing an electronic carrier from its link. The TMD may throttle an SLIP connection by sending XON/XOFF to the underlying serial terminal.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device for managing multiple back-end network connections, comprising:
    a transceiver for receiving requests and responses and sending information for throttling replies from a plurality of server connections to a client; and
    a management system that performs actions using the transceiver, including:
    receiving a set of pipelined ordered requests from the client, each request having a corresponding expected response;
    dispatching the ordered requests to a plurality of servers wherein each request dispatched to a server corresponds to a server connection;
    serially throttling each server connection corresponding to an expected response, based on the ordering of the outstanding ordered requests, to delay receipt of a response from a server other than the current expected response from the server corresponding to a current ordered request such that buffering at the network device of responses other than the current expected response is eliminated, wherein throttling a server connection comprises delaying receipt of a reply on the server connection; and
    based on receiving a current expected response to the current ordered request, un-throttling the next server connection corresponding to the next ordered request, wherein said next ordered request becomes the current request.

2. The network device of claim 1, wherein the throttling of each server connection is performed prior to dispatching an ordered request to the throttled server connection.

3. The network device of claim 1, wherein the throttling of a server connection further comprises reducing a size of the TCP receive window of the server connection and un-throttling comprises increasing the size of the TCP receive window of the server connection.

4. The network device of claim 1, wherein at least one of the pipelined requests is an HTTP pipelined request.

5. The network device of claim 1, wherein dispatching each of the ordered requests further comprises load balancing each of the ordered requests across a plurality of servers.

6. The network device of claim 1, wherein the throttling of a server connection further comprises dropping at least one packet, and wherein un-throttling of a server connection further comprises transmitting three ACK packets in succession.

7. The network device of claim 1, wherein the set of pipelined ordered requests comprises exactly N requests, and dispatching each of the ordered requests to a corresponding server comprises dispatching the N ordered requests to N corresponding server connections.

8. The network device of claim 1, wherein dispatching each of the ordered requests to a corresponding server comprises dispatching at least two ordered requests to a same one server connection in the plurality of server connections.

9. A method, operating on a network device, of managing a pipelined communication over a network, comprising:
(a) receiving a pipelined set of ordered requests from a client, each request having a corresponding expected response;
(b) dispatching the ordered requests to a plurality of servers, wherein each dispatched ordered request corresponds to a server connection;
(c) serially throttling the server connections based on the order of the corresponding expected responses to delay receipt of responses other than a current expected response, such that buffering at the network device of responses other than the current expected response is eliminated;
(d) receiving a current expected response from one of the plurality of server connections, the current expected response corresponding to a current request in the set of ordered requests; and
(e) based on receiving the current expected response, un-throttling a server connection corresponding to the next request following the current request of (d), wherein said next request becomes the current request.

10. The method of claim 9, wherein the method is configured to operate on a traffic management device.

11. The method of claim 9, further comprising throttling at least one server connection prior to dispatching an ordered request to said at least one server connection.

12. The method of claim 9, further comprising repeating steps (d) and (e) at least one time, until a response corresponding to each request is received.

13. The method of claim 9, wherein the pipelined set of ordered requests comprises exactly N requests, and dispatching the ordered requests to a plurality of server connections comprises dispatching the N ordered requests to N server connections.

14. The method of claim 9, wherein dispatching the ordered requests to a plurality of server connections comprises dispatching at least two ordered requests to a same one server connection in the plurality of server connections.

15. The method of claim 9, wherein the pipelined request is a HTTP pipelined request.

16. The method of claim 9, wherein dispatching the ordered requests further comprises load balancing the requests across a plurality of servers associated with the plurality of server connections.

17. The method of claim 9, wherein dispatching the plurality of ordered requests to the plurality of server connections further comprises dispatching the ordered requests in parallel to the plurality of server connections.

18. The method of claim 9, wherein throttling of a server connection further comprises decreasing a size of a TCP receive window and un-throttling a server connection comprises increasing the size of a TCP receive window.

19. The method of claim 9, wherein throttling of a server connection further comprises dropping at least one packet, and un-throttling of the server connection further comprises transmitting three ACK packets in succession.

20. The method of claim 9, further comprising forwarding each response to the client in a sequence corresponding to the sequence of the set of ordered requests.

21. The method of claim 9, wherein throttling of server connections comprises:
determining the one of the server connections corresponding to the current expected response corresponding to the current request; and
throttling the server connections other than said one of the server connections in order to increase the likelihood that the response corresponding to the current request is received prior to responses corresponding to requests other than the current request.

22. The method of claim 9, wherein throttling of server connections comprises:
determining the one of the server connections corresponding to the response corresponding to the current request; and
reducing the size of a TCP receive window corresponding the server connections other than said one of the server connections.

23. The method of claim 9, wherein dispatching the ordered requests to a plurality of servers comprises dispatching at least two ordered requests to one of the corresponding server connections, and wherein receiving a response comprises setting a window size corresponding to said one of the server connections based on a size of the response.

24. A computer-readable storage medium having computer-executable instructions stored thereon, which when executed by at least one processor causes the at least one processor to perform one or more actions of managing a communication over a network, the actions comprising:
receiving a plurality of pipelined requests from a client;
splitting of the pipelined requests into an ordered set of requests, each request having a corresponding expected response;
dispatching each of the requests in the ordered set to a plurality of servers, wherein each request dispatched to a server corresponds to a server connection;
performing the following until the corresponding expected response to each ordered request has been received:
serially throttling each server connection corresponding to a current expected response to delay the receipt of responses other than the current expected response, such that buffering at the network device of responses other than the current expected response is eliminated;
receiving a current expected response corresponding to the current request; and
based on receiving the current expected response, un-throttling the next server connection corresponding to the next ordered request, wherein said next ordered request becomes the current request.

25. The computer-readable storage medium of claim 24, the actions further comprising
forwarding each received expected response corresponding to an ordered request to the client in the same order as the ordered requests.

26. The computer-readable storage medium of claim 24, wherein each pipelined request is an HTTP pipelined request.

27. The computer-readable storage medium of claim 24, wherein dispatching the ordered requests further comprises load balancing the requests across a plurality of servers associated with the server connections.

28. The computer-readable storage medium of claim 24, wherein throttling the communication receive flow further comprises decreasing a size of a TCP receive window and un-throttling the communication receive flow further comprises increasing the size of a TCP receive window.

29. The computer-readable storage medium of claim 24, wherein throttling the server connection further comprises dropping at least one packet, and wherein un-throttling the server connection comprises transmitting three ACK packets in succession.

30. A traffic management device for managing an HTTP pipelined communication between a client and multiple back-end server connections, comprising a processor programmed to perform actions including:
receiving a plurality of HTTP pipelined ordered requests from a client, each request having a corresponding expected response;
dispatching each ordered request to a corresponding back-end server connection such that an expected response corresponding to the ordered request corresponds to the back-end server connection;
serially throttling a back-end server connection by decreasing a size of a TCP receive window for each back-end server connection based on the ordering of the corresponding expected response, to increase the likelihood that the current expected response in the ordering is received next, while eliminating buffering at the network device of responses other than the current expected response
receiving the current expected response corresponding to the current ordered request; and
based on receiving the current expected response, un-throttling the next back-end server connection by increasing the size of the TCP receive window for the next back-end server connection based on the ordering of the corresponding ordered request.

31. The traffic management device of claim 30, wherein dispatching the ordered requests further comprises load balancing the requests across M back-end servers associated with the server connections, wherein M is less than or equal to the number of ordered requests.

32. The traffic management device of claim 25, further comprising receiving each expected response and forwarding each received expected response to the client in the order corresponding to that of the set of ordered requests.

33. A computer-readable storage medium having computer-executable instructions stored thereon, which when executed by at least one processor causes the at least one processor to perform one or more actions of managing multiple back-end network connections, the actions comprising:
splitting a pipelined request from a client into a set of N ordered requests, each request having a corresponding expected response;
dispatching the N ordered requests in parallel to N servers wherein each dispatched ordered request corresponds to a TCP server connection, wherein a TCP receive window is associated with each one of the N TCP server connections;
throttling N TCP server connections by decreasing a size of the TCP receive window associated with the TCP server connection, and
un-throttling a TCP server connection in the N TCP server connections by increasing the size of the TCP receive window associated with the TCP server connection;
if a TCP server connection is throttled, holding a response corresponding to one of the N ordered requests at the server corresponding to the TCP server connection;
if a TCP server connection is un-throttled, providing a response to a corresponding one of the N ordered requests by the server; and
un-throttling each TCP server connection in a sequence that corresponds to the order of the N expected responses, wherein the other TCP server connections remain throttled, such that buffering at the network device of responses other than the expected response is eliminated.

34. The computer-readable storage medium of claim 33, the actions further comprising forwarding each response to the client in the order corresponding to the set of ordered requests.

35. A network device for managing multiple back-end network connections, comprising:
a transceiver for receiving and sending information to a computing device;
a receiving component that receives a set of pipelined ordered requests from a client, each request having a corresponding expected response;
a dispatching component that dispatches each of the ordered requests to a server of a plurality of servers, in the same order as the request, wherein the dispatching of each of the ordered requests further comprises dispatching the ordered requests to a server connection corresponding to said server of the plurality of servers; and
means for delaying receipt of the expected responses from each server so that server responses are received in an order corresponding to the ordered requests, and such that buffering at the network device of responses other than the current expected response is eliminated;
wherein the means for delaying a receipt further comprises:
means for throttling server connections other than a server connection corresponding to the current expected response; and
means for un-throttling the next server connection based on the ordering of the ordered requests in response to receiving the current expected response.

36. The network device of claim 35, the means for delaying a receipt further comprises
means for, in response to receiving a server response, modifying a TCP window size corresponding to a server connection, to receive a server response corresponding to the server connection.

37. The network device of claim 35, further comprising means for forwarding each response to the client in the order corresponding to the set of ordered requests.

38. The network device of claim 35, the means for delaying a receipt further comprises means for manipulating transport layer protocol parameters to prevent server responses from arriving out of order, based on an ordering of the ordered requests.

39. A network device for managing requests from a client, comprising:
   a transceiver for receiving and sending information to a computing device; and
   a management system that performs actions using the transceiver, including:
      receiving a plurality of ordered application layer requests, from a client, each request having a corresponding expected response;
      dispatching the plurality of ordered requests to a plurality of servers using corresponding transport layer server connections; and
      manipulating the transport layer server connections corresponding to expected responses, based on the ordering of the requests, to delay receipt of responses other than the current expected response, such that buffering at the network device of responses other than the current expected response is eliminated.

40. The network device of claim 39, wherein manipulating the transport layer server connection comprises setting a TCP receive window size corresponding to the transport layer server connection corresponding to an expected response to effect delaying receipt of responses to other than the current expected response.

41. The network device of claim 39, the actions further comprising manipulating additional transport layer server connections of the plurality of transport layer server connections in order to receive additional responses corresponding to each additional transport layer server connection in an order corresponding to the order of the ordered application layer requests.

* * * * *

UNITED STATES PATENT AND TRADEMARK OFFICE
CERTIFICATE OF CORRECTION

PATENT NO. : 7,657,618 B1
APPLICATION NO. : 11/139061
DATED : February 2, 2010
INVENTOR(S) : Rothstein et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1235 days.

Signed and Sealed this

Twenty-eighth Day of December, 2010

David J. Kappos
*Director of the United States Patent and Trademark Office*